United States Patent [19]

McClean

[11] Patent Number: 5,778,768
[45] Date of Patent: Jul. 14, 1998

[54] IN OR RELATING TO WOKS

[75] Inventor: John William McClean, Sydney, Australia

[73] Assignee: Breville Pty. Ltd., Botany, Australia

[21] Appl. No.: 724,529

[22] Filed: Sep. 30, 1996

[30] Foreign Application Priority Data

Sep. 28, 1995 [AU] Australia ................... PN5701

[51] Int. Cl.[6] .................. A47J 36/34; A47J 27/66
[52] U.S. Cl. ............... 99/422; 99/426; 219/457
[58] Field of Search ............ 99/422, 426; 219/459, 219/521, 457

[56] References Cited

U.S. PATENT DOCUMENTS

| | | | |
|---|---|---|---|
| 3,384,195 | 5/1968 | Jepson et al. | |
| 4,435,638 | 3/1984 | Simon et al. | 99/426 X |
| 4,492,853 | 1/1985 | Lam | 219/521 X |
| 5,129,314 | 7/1992 | Hu | 99/422 |
| 5,345,062 | 9/1994 | Maudal | 219/459 X |

FOREIGN PATENT DOCUMENTS

| | | |
|---|---|---|
| 1183286 | 11/1959 | France. |
| 2148096 | 5/1985 | United Kingdom. |
| 2280099 | 1/1995 | United Kingdom. |

*Primary Examiner*—Reginald L. Alexander
*Attorney, Agent, or Firm*—Jacobson, Price, Holman & Stern, PLLC

[57] ABSTRACT

A wok having an electric heating element a first portion of which extends in the area of the underside of the central portion of the wok and a second portion continuous with the first portion which extends circumferentially on the underside of the wok in a substantially part circular path extending over curved portions of the wok surrounding the central portion, the heating element being secured to the outer surface of the wok.

9 Claims, 2 Drawing Sheets

IN OR RELATING TO WOKS

FIELD OF THE INVENTION

The present invention relates to woks and more particularly to electrically heated woks.

BACKGROUND OF THE INVENTION

Electrically heated woks normally have a relatively flat central portion, to the underside of which an electric heating element is attached. While such woks are reasonably satisfactory they do have the defect that the heat is mainly concentrated at the bottom of the container and relatively little heat is available for cooking food in the curved area of the wok surrounding the central portion.

Users of woks that do not incorporate all electric heating element usually keep the wok in movement over a gas flame so that heat is applied not only to the bottom of the wok but to portions of the sides adjacent the central portion. The object of the present invention is to provide an electrically heated wok having a heating element embracing the curved portions of the wall of the wok surrounding the central portion.

Woks are made from a variety of different materials and in particular pressed aluminium sheet or cast aluminium. Where the wok is made from sheet aluminium the heating element is attached by welding or brazing; where the wok is made from cast aluminium the heating element is attached by being staked into a groove formed on the outer surface of the wok.

SUMMARY OF THE INVENTION

The present invention consists in a wok having an electric heating element a first portion of which extends in the area of the underside of the central portion of the wok and a second portion continuous with the first portion which extends circumferentially on the underside of the wok in a substantially part circular path extending over curved portions of the wok surrounding the central portion, the heating element being secured to the outer surface of the wok.

BRIEF DESCRIPTION OF THE DRAWINGS

In order that the nature of the invention may be better understood a preferred form thereof is illustrated, by way of example, in the accompanying drawings, in which.

DETAILED DESCRIPTION OF THE PREFERRED EMBODIMENTS

Figure 1:
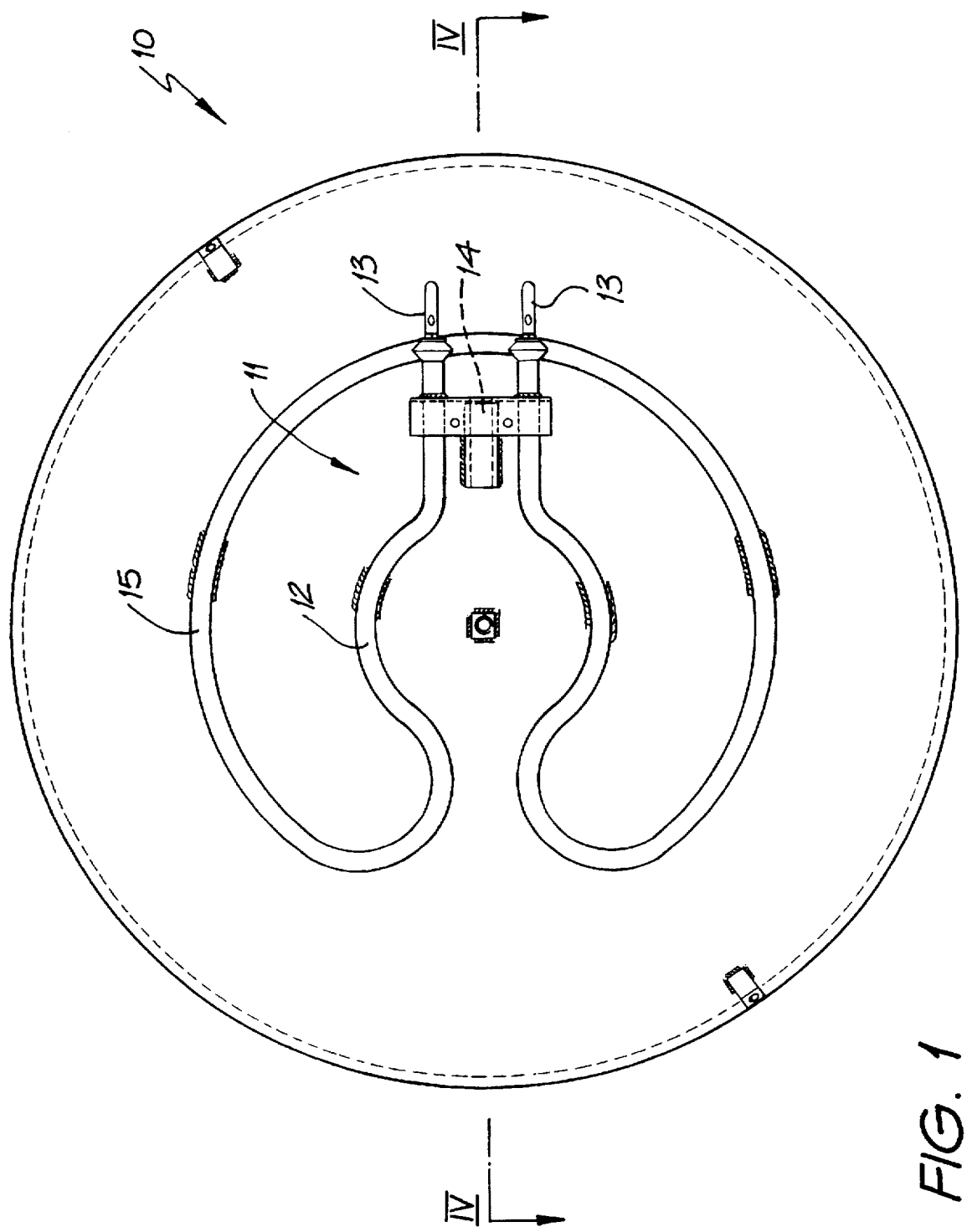
FIG. 1 is a view of the underside of a wok according to one form of the invention.

FIG. 1 shows a view of the underside of a wok 10 having on its underside an electric heating element 11. The electric heating element consists of a first portion 12 which extends over the central area only of the wok and is terminated in connectors 13, a probe tunnel 14 being arranged in the position shown.

Figure 4:
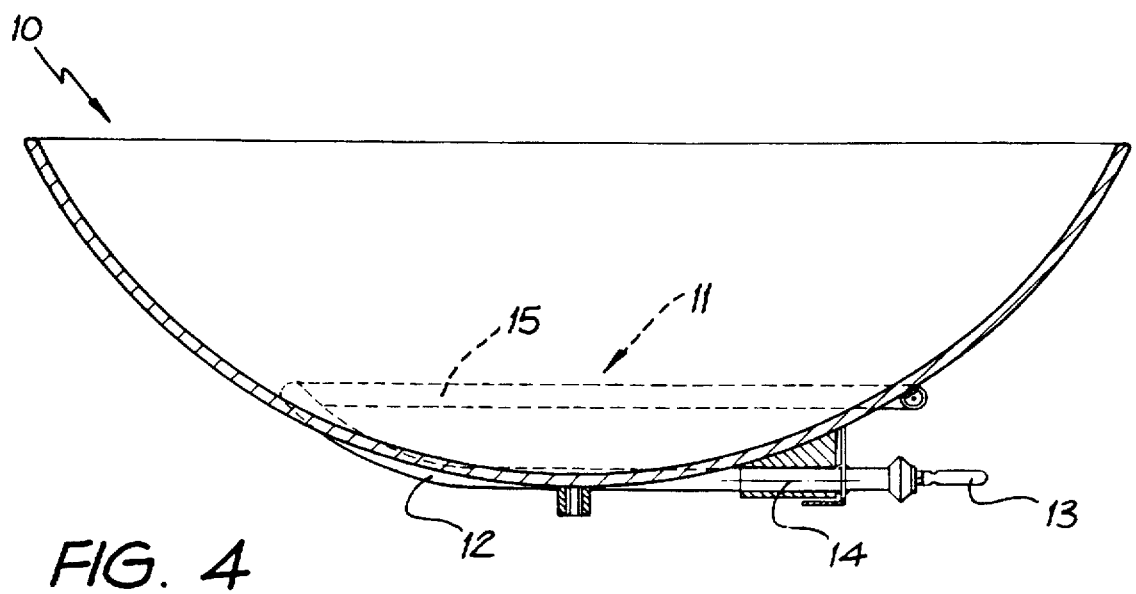
FIG. 4 is a section on line AA of FIG. 1.

The heating element 11 has a second portion 15 which extends circumferentially over an area of the curved surface of the wok at a distance from the center corresponding to the area in which food may be cooked. It is considered that a suitable diameter for the outer portion 15 of the heating element is of the order of 23 cm. As may be seen from FIG. 1 the portion 15 of the heating element is continuous with the portion 12. It is preferred that the cross-section of the heating element should be D-shaped as seen in FIG. 4, the flat surface lying against the surface of the wok.

Figure 2:
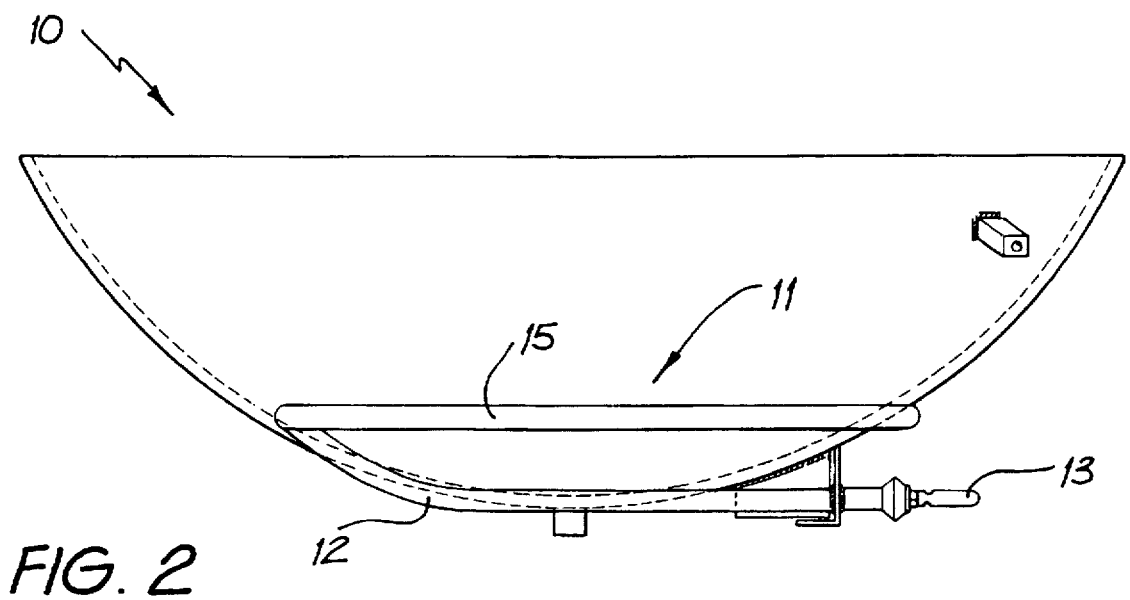
FIG. 2 is a side elevation thereof.
Figure 3:
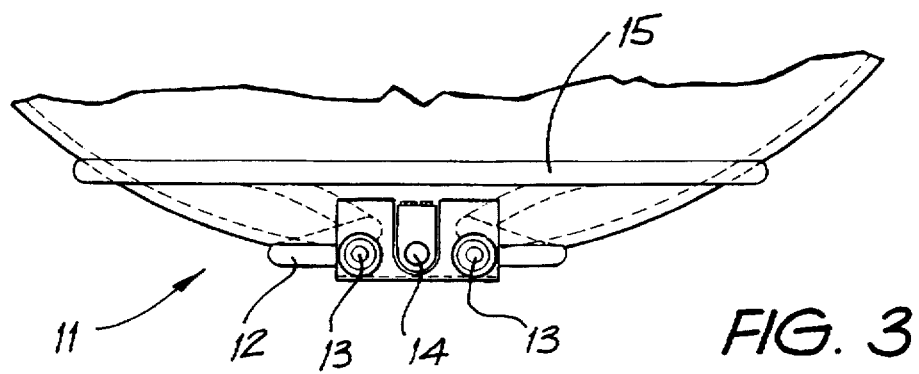
FIG. 3 is a front elevation of the lower parts thereof.

The body of the wok 10 is formed from aluminium sheet which is pressed to the shape shown in FIG. 2 and the heating element 11 is secured to the outer surface of the wok by brazing. It is to be noted that it is essential that the brazing metal should make close contact both with the metal of the wok and with the heating element so that heat is conducted effectively from the heating element to the body of the wok.

A wok made from cast aluminium will have an appearance similar to the wok shown in FIG. 1, the heating element in this case being set in a groove formed on the underside of the wok, the heating element being held in position by staking.

It will be appreciated by persons skilled in the art that numerous variations and/or modifications may be made to the invention as shown in the specific embodiments without departing from the spirit or scope of the invention as broadly claimed. The present embodiments are, therefore, to be considered in all respects as illustrative and not restrictive.

I claim:

1. A wok comprising a rounded body defining an outer surface, the rounded body part having a rounded central portion defining a curved bottom part, and curved portions surrounding the central portion, an electric heating element terminating in a pair of adjacent connectors, a first portion of the heating element defining a pair of opposed "C" shaped parts symmetrically disposed about a plane passing midway between the connectors and through a center of the outer surface and a second portion continuous with the first portion extending circumferentially on the outer surface in a part circular path extending over the curved portions surrounding the central portion and, each of the "C" shaped parts of the first portion bending in an opposite sense to a curve of the "C" shape to join with the second portion and the second portion also being symmetrically disposed about the plane, and the heating element being integral with and secured to the outer surface of the body part.

2. A wok as claimed in claim 1, wherein the wok is made of pressed sheet aluminum and the hating element is secured to the outer surface by brazing.

3. A wok as claimed in claim 1, wherein the wok is made from cast aluminum and the heating element is attached to the outer surface by staking in grooves cast on the outer surface.

4. A wok as claimed in claim 2, wherein a diameter of the second portion of the heating element is substantially 23 cm.

5. A wok as claimed in claim 2, wherein the heating element is of a D-shaped cross-section, a flat surface thereof lying against the outer surface.

6. A wok comprising a rounded body part defining an outer surface, the rounded body part having a rounded central portion defining a curved bottom part, and curved portions surrounding the central portion, an electric heating element terminating in a pair of connectors, a first portion of which heating element extending in an area of an underside of the central portion defining opposed "C" shaped parts symmetrically disposed about a plane passing midway between the connectors and through a center of the outer surface and a second and a second portion continuous with the first portion extending circumferentially on an underside of the curved portions surrounding the central portion in a part circular path, and each of the "C" shaped parts bending in an opposite sense to a curve of the "C" shape to join with the second portion and the second portion being symmetrically disposed about the plane and the heating element being integral with the wok, secured to the outer surface of the body part and of a D-shaped cross-section, a flat surface thereof lying against the outer surface.

7. A wok as claimed in claim 6, wherein the wok is made of pressed sheet aluminum and the heating element is secured to the outer surface by brazing.

8. A wok as claimed in claim 6, wherein the wok is made from cast aluminum and the heating element is attached to the outer surface by staking in grooves cast on the outer surface.

9. A wok as claimed in claim 6, wherein a diameter of the second portion of the heating element is substantially 23 cm.

* * * * *